United States Patent [19]
Gillette et al.

[11] Patent Number: 4,766,430
[45] Date of Patent: Aug. 23, 1988

[54] DISPLAY DEVICE DRIVE CIRCUIT

[75] Inventors: Glynn G. Gillette, Flemington; Roger G. Stewart, Neshanic Station; John T. Fischer, Princeton, all of N.J.

[73] Assignee: General Electric Company, Fairfield, Conn.

[21] Appl. No.: 943,496

[22] Filed: Dec. 19, 1986

[51] Int. Cl.[4] .............................................. G09G 3/36
[52] U.S. Cl. ................................. 340/793; 340/767; 340/784; 340/805; 340/800; 358/241; 358/236
[58] Field of Search .............. 340/784, 793, 767, 805, 340/703, 802, 801, 800; 358/241, 236, 168, 283

[56] References Cited

U.S. PATENT DOCUMENTS

| | | | |
|---|---|---|---|
| 4,180,813 | 12/1979 | Yoneda | 340/784 |
| 4,210,934 | 7/1980 | Kutaragi | 358/241 |
| 4,353,062 | 10/1982 | Lorteije et al. | 340/767 |
| 4,427,978 | 1/1984 | Williams | 340/784 |
| 4,429,305 | 1/1984 | Hosokawa et al. | 340/784 |
| 4,554,539 | 11/1985 | Graves | 340/805 |
| 4,571,584 | 12/1986 | Suzuki | 340/784 |

Primary Examiner—John W. Caldwell, Sr.
Assistant Examiner—Edwin C. Holloway, III
Attorney, Agent, or Firm—E. M. Whitacre; D. H. Irlbeck; L. L. Hallacher

[57] ABSTRACT

A drive circuit for a liquid crystal display includes a counter for each column of the display. The counters are set with brightness counts to establish the grey scales for the pixels. The counters turn transfer gates on when a count is present and off when the count is zero. An analog generator biases the columns through the transfer gates so that each column is biased to a level determined by the brightness count of the respective counter.

6 Claims, 2 Drawing Sheets

DISPLAY DEVICE DRIVE CIRCUIT

BACKGROUND

This invention relates generally to display device drive circuits and particularly to a drive circuit for a liquid crystal display.

Many display devices, such as liquid crystal displays, are composed of a matrix of active elements, or pixels, arranged vertically in columns and horizontally in rows. The data to be displayed are applied as drive voltages to data lines which are individually associated with each column of active elements. The rows of active elements are sequentially scanned and the individual active elements within the activated row are illuminated to various grey scale levels in accordance with the levels of the drive voltage applied to the various columns.

Accurate analog drive circuits are needed to drive color liquid crystal television displays, and high quality liquid crystal data displays. The use of discrete analog drive circuits for each of the data lines, which typically number 1440, is impractical because of cost, power and noise considerations. For this reason, time domain averaging and transmission gate multiplexing have been tried. In time domain averaging, grey scales are achieved by applying the full voltage to the liquid crystals for only a fraction of the full display time, so that when averaged over the full display time the RMS level is only a fraction of the fully on value of the liquid crystals. Such techniques produce only very crude three or four bits, i.e. eight to sixteen levels, of grey scale and significantly increase flicker of the display. Attempts have also been made to multiplex the analog signal directly into the array via transmission gates. However, only a small fraction of the line time is available to charge the data line capacitance, which typically is 20 to 100 picofarads, depending upon the size of the array. The speed of performance needed for the transmission gate increases in proportion to the number of display elements in the array and, therefore, multiplexing is not satisfactory for scaling arrays of more than 16,000 pixels, even if very high mobility polysilicon transmission gates are used. The display of color television on a liquid crystal requires an array having 250,000 to 750,000 pixels. Accordingly, multiplexing is unsatisfactory for such displays. Also, multiplexing would leave unequal time for pixels along the same word line to equalize with the data line, and would result in unequal grey scale smearing along the data lines. This undesirable result occurs because the columns are sequentially scanned and the later scanned columns have less time to settle than the earlier scanned columns. For these reasons, there is a need for an accurate analog drive circuit for liquid crystal displays including the large number of active elements needed for a color television display, or for a high quality data display. The present invention fulfills this need.

CROSS REFERENCE TO RELATED APPLICATION

The invention described in U.S. application Ser. No. 943,709 entitled "System For Applying Grey Scale Codes To The Pixels Of A Display Device" filed on even date herewith by G. Gillette, R. G. Stewart and J. T. Fischer can be used with the present invention.

SUMMARY

A drive circuit for a display device having a matrix of picture elements, arranged vertically in columns and horizontally in rows, includes means for receiving a signal and providing digital brightness signals individually indicative of brightness levels for each picture element. A digital storage means stores the digital brightness signals for all picture elements within the matrix. A counter receives and stores the digital brightness signals as brightness counts. Transfer gates activate each column of picture elements in response to conduction control means which are responsive to the counter. An analog signal generator applies a varying voltage to all of the columns during actuation of the transfer gates whereby the picture elements of individual columns are biased to various levels in accordance with the brightness counts.

DETAILED DESCRIPTION

Figure 1:
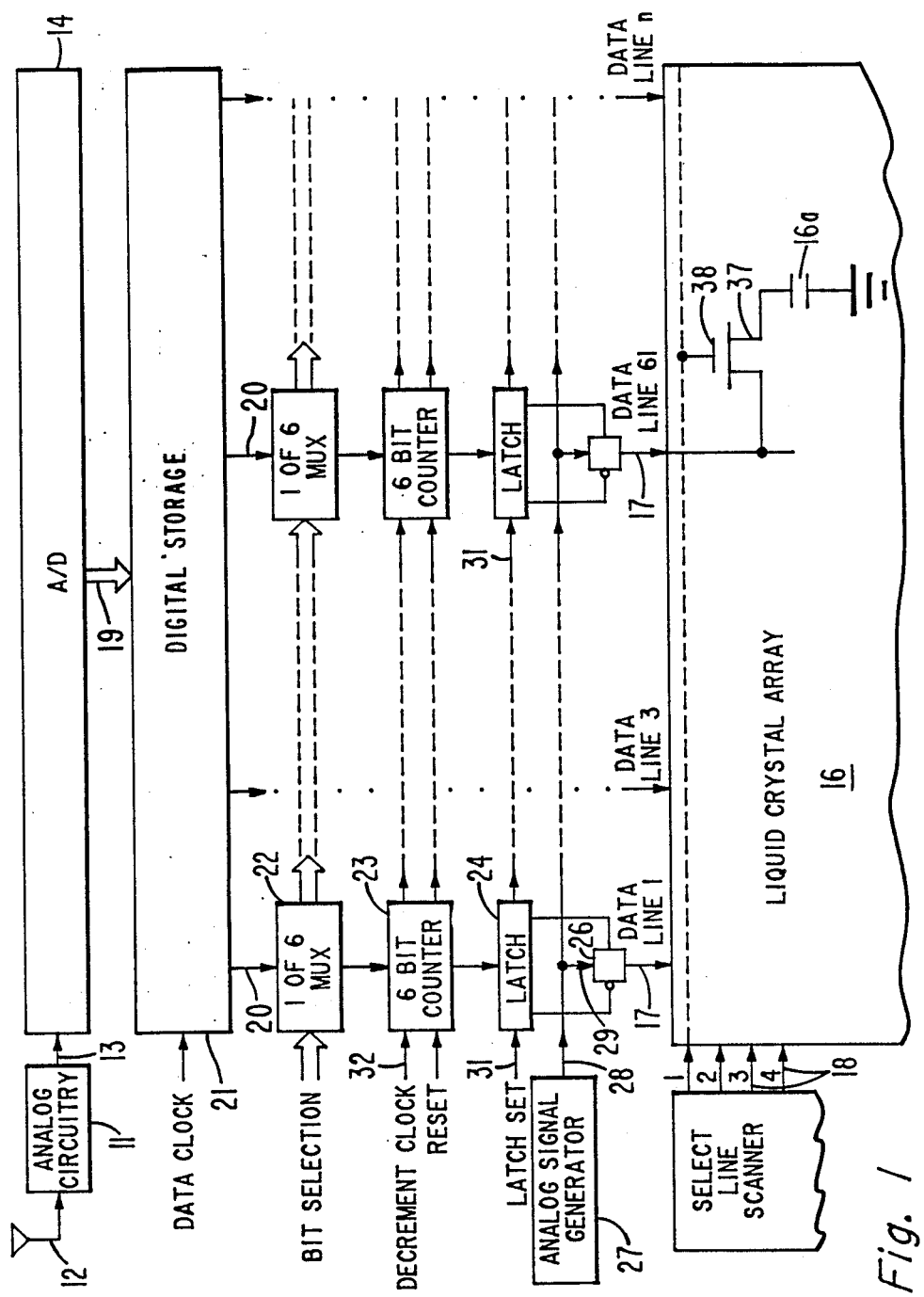
FIG. 1 is a preferred embodiment.

In FIG. 1, analog circuitry 11 receives an analog information signal representative of the data to be displayed from an antenna 12. When the incoming signal is a television video signal, the analog circuitry 11 is a standard television receiver of a type well known to those skilled in the art. The analog circuitry 11 provides an analog, data bearing signal, on a line 13 as an input signal to an analog-to-digital converter (A/D) 14. The invention can also be used to display graphic data received from a computer. In this event, the data are already digital and the analog circuitry 11 and A/D 14 can be eliminated. Hereinafter, the invention is described for use in displaying a television display, either monochrome or color.

The television signal from the analog circuitry 11 is to be displayed on a liquid crystal array 16, which is composed of a large number of picture elements, such as the liquid crystal 16a, arranged horizontally in rows and vertically in columns. Liquid crystal displays for color television, or high quality data displays, typically include 250,000 to 750,000 liquid crystals. Typically, the number (n) of vertical columns is 1440 and, accordingly, the number (m) of horizontal rows is 175 to 520. Accordingly, in FIG. 1, the liquid crystal array 16 includes n column drive lines 17, one for each of the vertical columns, and m line select input leads 18, one for each of the horizontal rows. The analog-to-digital converter 14 includes an output bus 19, to provide brightness levels, or grey scale codes, to a digital storage means 21 having a plurality of output lines 20. The output lines 20 of the digital storage means 21 control the voltages applied to the column drive lines 17 for the columns of liquid crystals 16a through multiplex means 22, counter means 23, conduction control means 24, and transfer gate means 26. Each of the output lines 20, therefore, controls the voltage applied to the liquid crystal in a particular column when the associated transfer gate 26 is on, and in accordance with the scanning of the select input lines 18. A preferred embodiment of the digital storage means 21 is in the form of a shift register and is described hereinafter with respect to FIG. 2. An arrangement of multiplex means, counter means, and transfer gate means which can be used with the present invention is described in copending U.S. application Ser. No. 943,709 fully referenced hereinabove.

The digital storage means 21 stores the digital brightness levels which are representative of the brightnesses with which the liquid crystals in the respective columns are to be illuminated. When a six bit grey scale is desired, i.e. sixty-four brightness levels, each of the digital brightness signals is a binary word representative of one of the sixty-four grey scale brightness levels. The binary representations of the grey scale levels are transferred through the multiplex circuits (MUX) 22 to six bit counters 23. Each of the six bit counters 23 is thereby set to a brightness count representative of the desired grey scale brightness level. In the preferred embodiment, the conduction control means 24 are latch circuits. The latches 24 control the conduction of the transfer gates 26 in accordance with the counts set into the counters 23. A latch set signal is applied to all the latches 24 by an input line 31. When the latches are set the outputs are high and the transfer gates 26 are conductive, or on. The latches remain set until the associated counter 23 decrements to zero, at which time the latch 24 changes state and the output goes low to render the associated transfer gate 26 nonconductive, or off.

An analog signal generator 27, which preferably is a ramp generator, has a master output bus 28 coupled to the column drive lines 17 by additional input lines 29 and through the transfer gates 26. Accordingly, when the transfer gate 26 of a particular column is turned on, because the count in the associated counter 23 has not decremented to zero, the liquid crystal cells within the column receive a voltage level determined by the level of the analog signal from the signal generator 27. Thus, at a given instant all turned on columns receive the same analog drive voltage.

Briefly stated, in operation, during the first line period the six bit grey scale code for each picture element for one horizontal line of the array 16 is loaded into the digital storage means 21. At the end of the line period, the horizontal line data are rapidly transferred from the digital storage means 21 to the six bit counters 23 for every vertical column. A latch set signal is applied to all the latches 24 by the latch set input line 31 and all the transfer gates 26 are turned on at the beginning of the line time at T0. During the second line period two operations take place. The grey scale data for the next line period are loaded into the digital storage means 21. Also, after an initial zero voltage drives the output bus 28 and all columns to ground, the analog signal generator 27 ramps the master output bus 28, and every "turned on" column within the liquid crystal array 16 is biased to the same level as the level of the analog signal on the master output bus 28. Thus, in a given instance, all of the columns within the array receive the same driver voltage from the signal generator 27 and the output of the signal generator 27 contains no display information. The analog voltages presented to the data input lines 17, therefore, are dependent solely upon the contents of the respective six bit counters 23. After a very short delay, each of the counters 23 is decremented by a clock input on an input line 32 and each of the counters 26 begins counting toward zero while the analog signal generator simultaneously ramps the master output bus 28 and some of the columns in the liquid crystal array to higher voltages. When a counter reaches the count of zero, the associated latch 24 is reset and turns off the transfer gate 26. The liquid crystal cell within the "turned off" column no longer receives the analog signal on the master output bus 28 and remains charged to the level which existed on the output bus 28 when the associated counter decremented to zero and turned off the respective transfer gate 26.

Figure 3:
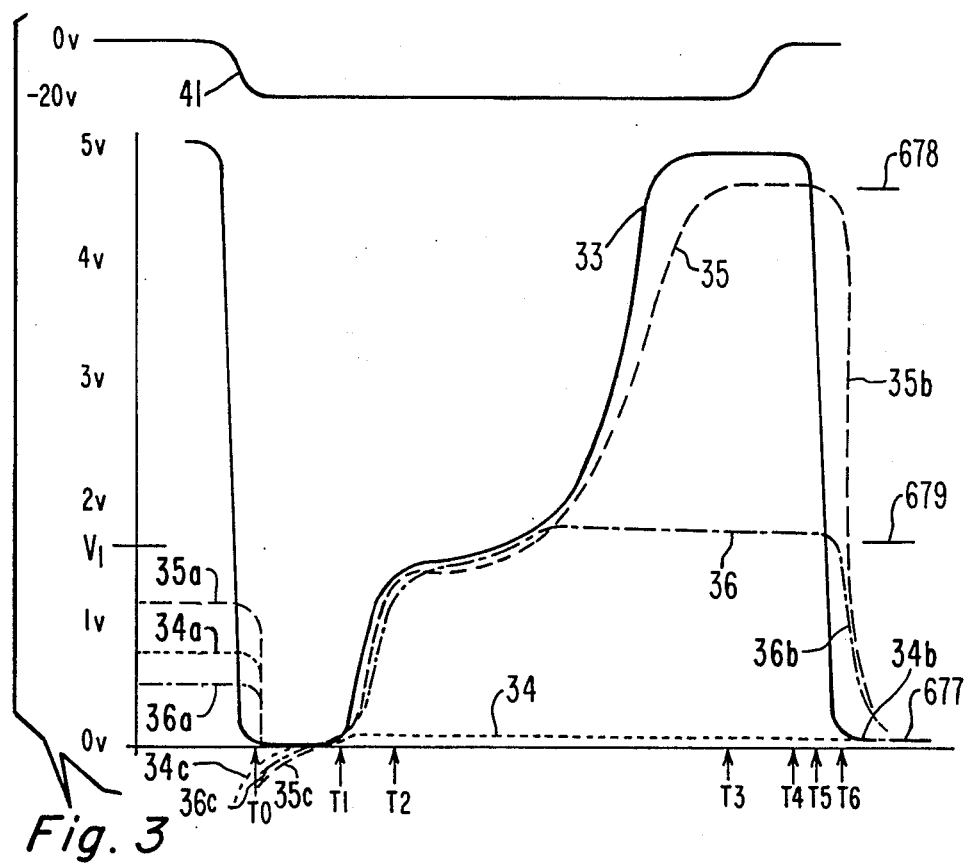
FIG. 3 shows an exemplary ramp drive voltage waveform, and the column drive and picture element voltages.

FIG. 3 shows an analog waveform 33 which can be provided by the signal generator 27 to the input lines 29. The FIGURE is useful in understanding how the liquid crystals in the various columns are charged to different levels, and shows how the line period is divided to perform the various functions. FIG. 3 also shows how the voltages on the bus 28 and on the liquid crystals 16a are different between consecutive line times, which extends between T0 and T6. The latches 24 are set and the transfer gates 26 are made conductive at the beginning of the line time at T0. The ramp 33 is applied to the master output bus 28 beginning at time T1. The liquid crystals 16a of every column begin to charge as the pulse 33 increases. The crystal charging continues until the transfer gate 26 is turned off when the associated counter 23 decrements to zero. For example, assume that the counter 23 for column number 677 is set to a very low count. The voltage presented to the crystals by the transfer gate 26 follows the ramp 33 for a very short time because the counter 23 and the latch 24 associated with the column turn off the transfer gate 26 before the ramp 33 reaches a high level. The crystals in column number 677, therefore, are charged to the very low level, as shown by curve 34. The counter for column 678 is set to a very high count and the voltage applied to the liquid crystals follows the curve 35. The transfer gate 26 for column 678 remains on for most of the line period and the liquid crystals within that column are charged to a high level. Other columns, such as number 679, which follows the curve 36, are set to intermediate counts and the crystals are charged to intermediate levels between the maximum and minimum voltages in accordance with the waveform 33 on the bus 28.

FIG. 3 shows the voltages 34, 35, and 36 having additional portions 34a, 35a and 36a prior to the beginning of the line time at T0, and also additional portions 34b, 35b and 36b subsequent to the end of the line time at T6. FIG. 3 also shows the pixel voltages which are present on the pixels from the previous frame time portions 34c, 35c, and 36c. The portions 34a, 35a and 36a represent the voltages which existed on the various data lines 17 when the respective transfer gates 26 when turned off during the immediately preceding ramp. The output line 28 goes to zero between consecutive ramps and therefore the data lines 17 also go to zero as soon as the transfer gates 26 are rendered conductive at T0 in preparation for the reception of the next ramp 33. The portions 34b, 35b and 36b show the data lines 17 going to zero when the transfer gates 26 are rendered conductive in preparation for the reception of the immediately following ramp. The portions 34a, 35a, 36a; the curves 34, 35, 36; and the portions 34b, 35b, 36b thus, show the changes in the condition of the data lines 17 for three consecutive ramps. The portions 34c, 35c and 36c represent the voltages remaining on the crystals 16a from the preceding picture frame. When the transfer gates 26 become nonconductive the crystals remain charged until the next frame time when the same select line is again enabled and the zero voltage between T0 and T1 which precedes the ramp 33 causes the crystals to discharge to zero. In a liquid crystal display, alternate picture frames are positive and negative. Accordingly, in FIG. 3, all the crystals in the display are negatively charged until the incoming ramp 33 first discharges, and then charges the crystals positively. However, the change in ramp polarity comes only after all of the select lines 18 are sequentially scanned.

In FIG. 3, the voltage curves 34, 35 and 36 do not exactly track the ramp 33 because of the inherent time delays of the transfer gates 26, the liquid crystals 16a and the associated active elements 37 (explained hereinafter). Also, the voltages 34, 35 and 36, immediately following the time T1 are shown separately for convenience of illustration, in reality the voltages are very nearly identical in the initial portion of the line time.

In FIG. 1, the liquid crystal 16a is coupled to the data line 17 through an active element 37, such as a thin film transistor (TFT). A control electrode 38 of the TFT 37 is coupled to the select line 1B. The impedance of TFT 37 combined with the capacitance of pixel 16a has a delay TP. The impedance of the transfer gates 26 combined with the data line capacitance have a delay TG. The line time TL, the time between T0 and T6 in FIG. 3, is the time each of the select lines 18 is actuated to generate one line of the full frame. The video sampling rate TS is defined as:

$$TS = \frac{TL}{\text{pixels/select line}}$$

The various time delays are selected such that:

TS<TP<TL and Ts<TG<TL.

In FIG. 3, the line time begins at T0 and the ramp voltage is zero. This allows the crystals to normalize from the voltage remaining from the preceding frame. Accordingly, the time between T0 and T1 is greater than the sum of TP and TG to permit all crystals to settle to zero. The counters 23 begin to decrement at time T1 and stop decrementing at T3. At the beginning of the line time at T0, a voltage 41 on the select line 18 changes from positive (+5 for example) to negative (−20 for example). These polarities are dependent upon the polarity of the TFT 37 and, thus, in some instances may be the opposite of those stated. The select line voltage remains negative beyond the decrement time T3 and returns to zero before the end of the full line time at T6. The ramp 33 rises rapidly from T1 to T2 to bring the ramp voltage up to the crystal transition voltage $V_1$ as rapidly as possible. Typically, the total line time T0 to T6 is in the order of 60μ sec. The time between T2 and T3, during which the crystals receive the grey scale brightness signals, typically is 37 to 40μ sec. Accordingly, a very large percentage of the total line time is available for charging all the crystals along the selected data line.

The time between T3 and T5, during which the ramp 33 remains high, is normally greater than TP and typically can be 15μ sec, for example. The transfer of data from the digital storage means 21 to the six bit counters 33 occurs between T4 and T5 and the line period ends at T6. The transfer of data from the A/D 14 to the digital storage means takes considerable time, and occurs during the preceding line period. The voltage 41 on the select line returns to positive, to turn off the previously selected row of transistors 37, prior to the end of the line period at T6 to assure that the voltages on that row of liquid crystals does not change.

Figure 2:
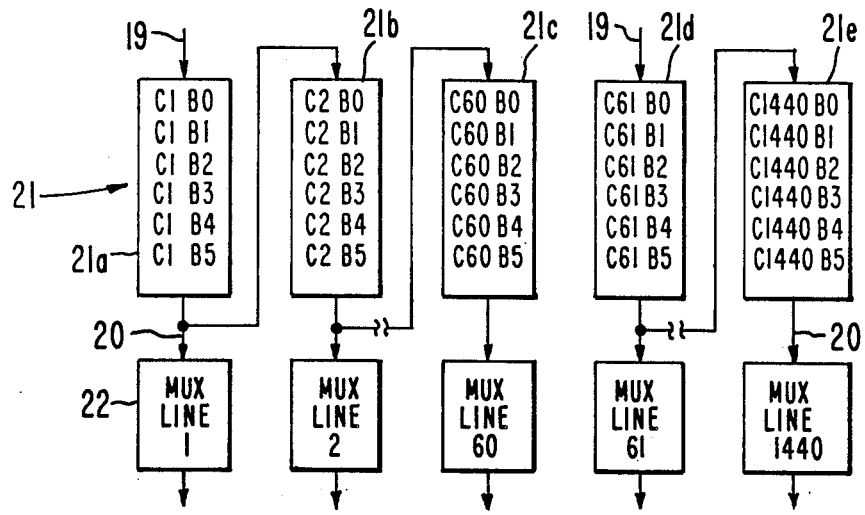
FIG. 2 is a preferred embodiment of the digital storage means of FIG. 1.

FIG. 2 is a preferred embodiment of the digital storage means 21 in the form of a segmented shift register. The driving of the array 16 requires 1440 six bit registers. Accordingly, the time required for loading the registers and the power requirements can be minimized by utilizing a first plurality of registers (for example 24) each of which includes a second plurality (for example 60) of six bit serially loaded registers. Six bit registers are used because six grey scales are intended, as the number of grey scales changes the storage capacity of the registers similarly changes. As shown in FIG. 2, the first of the 24 registers includes 60 six bit serially connected registers, three of which are shown as 21a, 21b and 21c. The first register 21a, is coupled to the first column of liquid crystals, and receives an input from the A/D 14. Register 21b is coupled to the second column of crystals, and register 21c is coupled to the sixtieth column of crystals. The output line 20 of each of the six bit registers 21 is coupled to the associated multiplex circuit 22. The remainder of the six bit registers are indicated as 21d and 21e. The register 21d represents the shift register for the sixty-first column of crystals and, thus, is the first of the six bit registers within the second set of 24. This register also receives an input from A/D 14. The six bit register 21e represents the six bit register associated with the last, or 1440th, column. This configuration of shift registers results in several advantages. Only 24 of the output lines 19 are needed for the analog-to-digital converter 14, but 1440 input lines 17 are available to the liquid crystal array 16. For this reason, the transfer of data from the A/D 14 to the registers 21 requires a substantial amount of time. However, the transfer occurs while the data for the preceding line are being transferred to the array 16. Because 1440 of the output lines 20 are available to the counters 23 the transfer of data to the counters is very rapid and preferably occurs during the period when the pixels are equalizing with their respective data lines so that no line time is wasted in the data transfer.

The generation of one frame of the display requires the sequential selection of each of the select lines 18. Upon the selection of each line, the above described transfer of data from the A/D 14 to the counters 23, and the application of the ramp 33 to the crystals 16a takes place. After the ramp 33 is applied to the last select line, one frame has been generated. The process is then repeated for the next frame. However, the ramp 33 is negative for subsequent frame. The generation of the ramp 33 is within the purview of one skilled in the art. For example, an oscillator, a counter, a ROM and digital-to-analog converter can be used to generate the ramp. The configuration of the ramp 33 also is within the purview of one skilled in the art and is selected to minimize the line time TL in accordance with the characteristics of the liquid crystals within the display.

What is claimed is:

1. A system for applying various voltage levels of a ramp voltage to the individual columns of pixels in a display device having a matrix of pixels arranged vertically in columns and horizontally in rows comprising:
 a plurality of voltage responsive signal transfer means individually actuating said columns of pixels, said signal transfer means simultaneously receiving said ramp voltage whereby pixel columns actuated by conductive signal transfer means are charged to voltage levels proportional to the level of said ramp voltage;

means for providing an analog information signal having brightness levels for controlling the brightness of said pixels;

means for receiving said analog information signal and providing digital brightness signals individually indicative of said brightness levels;

digital storage means for receiving and storing said digital brightness signals, said digital storage means including a plurality of digital storage sets, each of said digital storage sets having a plurality of serially loaded digital storage segments, each of said digital storage segments storing said grey scale codes for one of said columns of pixels to individually provide said brightness signals to said columns;

a plurality of counter means individually responsive to said digital storage segments for receiving said digital brightness signals as brightness counts for each of said columns, whereby said counter means are set to counts equal to said brightness levels and are set to count to zero, said counter means individually actuating said voltage reponsive signal transfer means whereby each of said signal transfer means is conductive when the associated counter is counting and nonconductive when the associated counter reaches zero whereby the pixels of individual columns are charged to various voltage levels of said ramp voltage in accordance with said brightness levels.

2. The drive circuit of claim 1 wherein said ramp voltage includes a zero voltage portion for providing time for said pixels to normalize from a preceding voltage.

3. The drive circuit of claim 2 wherein said digital storage segments are shift registers, having a storage capacity equal to the number of said brightness levels.

4. In a display device, having a matrix of picture elements arranged in m rows and n columns, for displaying a picture in response to a video signal including brightness information for each of said picture elements, a drive circuit comprising:

analog-to-digital converter means for converting said video signal into digital grey scale codes for each of said picture elements;

digital storage means for receiving said grey scale codes for the picture elements in the respective columns, said digital storage means including a plurality of digital storage sets, each of said digital storage sets having a plurality of digital storage segments, each of said digital storage segments storing said grey scale codes for one of said columns, whereby said digital storage means includes n of said digital storage segments;

digital counter means, individually responsive to said digital storage segments, for receiving said grey scale codes whereby said counters are set to counts representative of selected grey scales;

latch circuit means, individually responsive to said digital counter means, said latch circuit means having a first output when the respective counter contains at least one count, and having a second output when the respective counter is empty;

transmission gate means, individually responsive to said latch circuit means, said transmission gate means being on when the output of said latch circuit means is said first output, and off when the output of said latch circuit means is said second ouput;

means for simultaneously providing a ramp voltage to all of said transmission gate means whereby the picture elements in the respective columns are charged to levels in accordance with said grey scale codes in said counters; and means for sequentially acanning said rows to sequentially apply said ramp voltage to said rows of picture elements whereby said picture is generated in a plurality of lines times, and wherein said grey scale codes are transferred to said digital storage means during a first line time and said ramp voltage is provided during a second line time.

5. The display device of claim 4 wherein said ramp voltage includes a zero voltage portion for providing time for said picture elements to normalize from a preceding voltage.

6. The display device of claim 5 wherein said picture elements are liquid crystals.

* * * * *